United States Patent [19]

Nicolini et al.

[11] 4,103,286
[45] Jul. 25, 1978

[54] DIGITAL BINARY GROUP CALL CIRCUITRY ARRANGEMENT

[75] Inventors: John Dominic Nicolini, Margate; David Frank Willard, Plantation, both of Fla.

[73] Assignee: Motorola, Inc., Schaumburg, Ill.

[21] Appl. No.: 770,327

[22] Filed: Feb. 22, 1977

[51] Int. Cl.² .................. G06F 7/02; H04M 11/02
[52] U.S. Cl. ................... 340/146.2; 340/146.3 WD; 340/311; 364/514
[58] Field of Search .......... 340/146.2, 146.3 WD, 340/146.3 Q, 146.3 Z, 167, 311, 312; 325/55

[56] References Cited

U.S. PATENT DOCUMENTS

| | | | |
|---|---|---|---|
| 3,806,922 | 4/1974 | Ibister | 340/167 B |
| 4,010,461 | 3/1977 | Stodolski | 340/311 |

*Primary Examiner*—Felix D. Gruber
*Attorney, Agent, or Firm*—Margaret Marsh Parker; James W. Gillman

[57] ABSTRACT

Group call capability is provided as for a digital pager having a two word page address and using asynchronous detection. A group call is initiated by transmitting two identical binary words having an extra bit space between them, the binary word being word one of the individual paging address of each unit in the group to be called.

8 Claims, 4 Drawing Figures

DIGITAL BINARY GROUP CALL CIRCUITRY ARRANGEMENT

BACKGROUND OF THE INVENTION

This invention relates to digital binary selective calling systems having group call capability and more particularly to such capability in asynchronous detectors, as in pagers, utilizing two-word, binary addresses.

In the field of paging and two-way data communications devices, there are two basic methods of address coding. The first type uses a sequence of tones modulated on a carrier frequency. Each unit, upon detecting the first tone of its unique address, listens for the second tone. If that tone is detected within a specified time interval, the unit listens for the third tone of its code, etc. Upon detection of the complete sequence of tones, an alert signal is provided, typically an audible tone. Group call capability can be added to a tone-addressed unit with additional circuitry, typically available as an optional module. For interface with telephone circuitry, however, digital binary addressing has certain advantages. Thus, units have been developed which use digital address codes, such as two "words", each made up of a number of bits of binary information. Such codes can provide for many more unique "addresses" on a given carrier frequency than tone codes can.

Digitally addressed units usually require that synchronizing information be provided in advance of the address code, to establish the beginning of the first word in order that the address may be accurately detected. A system providing a means of detecting an asynchronous address within a train of binary signals is disclosed in U.S. Pat. No. 3,801,956 and assigned to the same assignee as the present invention. In this system, the received binary word is entered into a sample register and compared bit by bit to an address word stored in a storage register. If a sufficient number of correlations are detected and counted, an alert signal is provided. Since the incoming binary word is cycled through a comparator, certain constraints are put on the words which can be used in a given system. In another U.S. Pat. No. 3,855,576, also assigned to the same assignee as the present invention, the above asynchronous detection method is applied to word one of a two word code sequence. When a paging receiver detects word one asynchronously, a counter is enabled and counts for a period long enough for a second received word to be entered into the sample register. Word two of the page code address is put into the storage register and compared with the second received word during a brief window at the end of the counting period. If a predetermined number of correlations is counted, an alert signal is then provided. In the first-noted patent, when using one 23 bit word, only 178 different words would be available in a single paging system. The system of the last-noted patent also allows for over 100 different first words, but since the word one detect provides synchronization for the detection of word two, over 4,000 different second words are possible. Thus, over 400,000 distinct two word combinations are available in a single system. However, in this system simultaneous addressing of a number of units is possible only by assigning them the same code address, making individual addressing possible only with two separate address codes for each unit.

SUMMARY OF THE INVENTION

It is therefore an object of the present invention to provide group call capability as in a digital communications device.

It is a particular object to provide such capability without losing individual address capability and without requiring a second address code.

It is a specific object to provide both capabilities within an asynchronous two word detection system.

These objectives are obtained in a system according to the invention by providing additional logic circuitry in, for example, a digital pager wherein word one of a page address can be detected asynchronously, then, using that word one detect as a sync signal, the pager counts a predetermined count before providing a "window" for looking for word two of the address. If, during this window, word two has been completely received, it is detected and an individual alert signal is given to the user. If word two is not detected, the logic circuitry switches back to looking for word one again. A group page for this system could alert all pagers having the same word one and the signal would consist of that word one sent twice in sequence but spaced farther apart than the two different words of the individual page signal. The circuitry of the invention counts a predetermined count after the word two detect "window". If word one has been received for the second time, this second detection of word one will trigger a group call alert which is separate from an individual page alert.

DETAILED DESCRIPTION OF A PREFERRED EMBODIMENT

Figure 1:
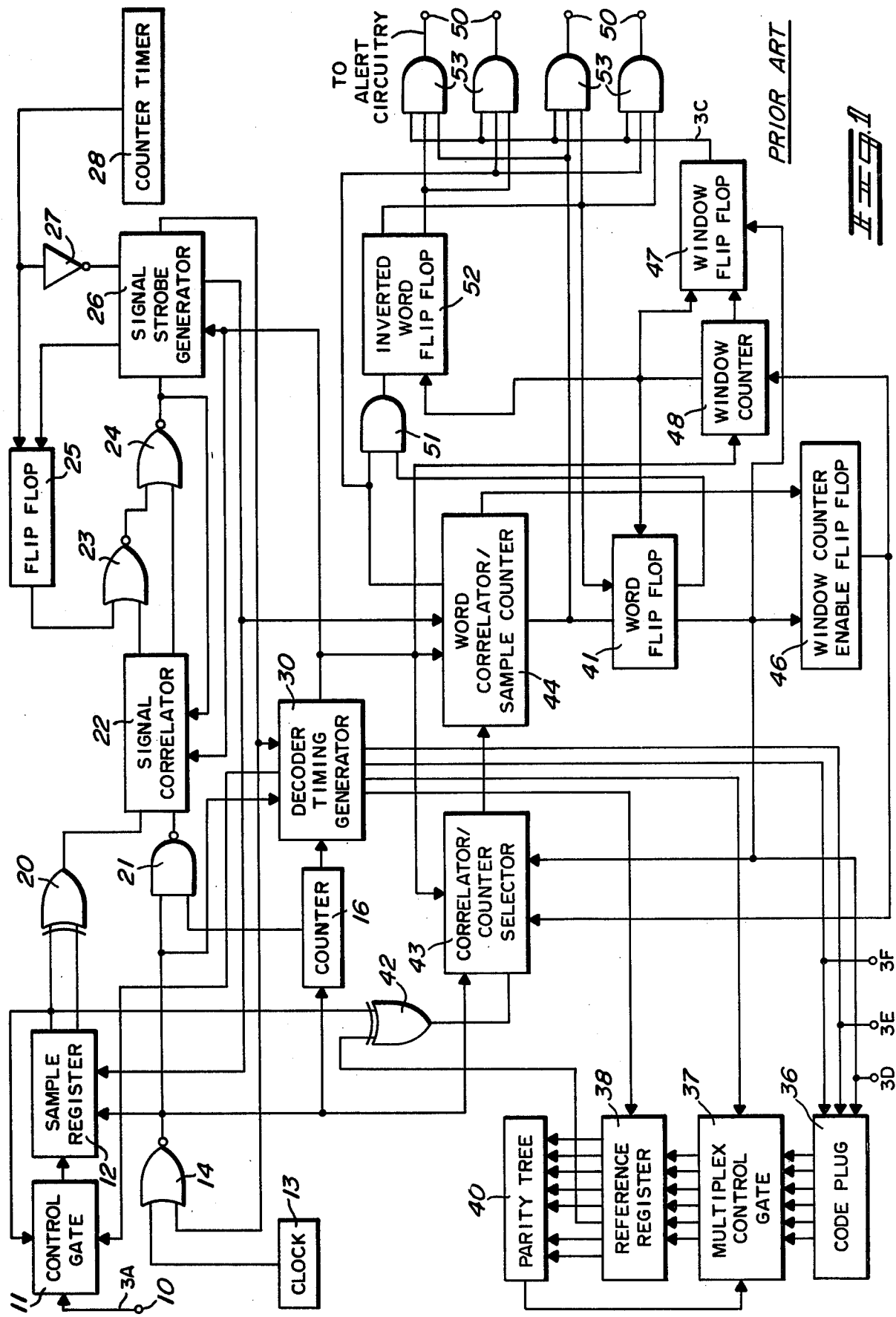
FIG. 1 is a block diagram of the asynchronous digital sequence detector to which the invention could be applied.

The detector circuit of FIG. 1 is taken, essentially unchanged, from U.S. Pat. No. 3,855,576, which is assigned to the same assignee as the present invention. The drawing is used in this form to facilitate reference to that patent, should that be desired.

Described in the above-mentioned patent, is the detector circuit for detecting asynchronously, i.e., with no preamble or framing required, an individual address code consisting of two 23 bit binary "words". Detection of word one is accomplished by cycling the received signal or data bits and the bits of word one of the stored address code and counting correlations. The detection of word one serves to "sync" the detection of word two. The combination of asynchronous word one detection and synchronous word two detection allows over 400,000 different two word addresses in a single system. It is possible with this detector and certain duplicate components to provide two addresses for two distinct alerts. In a pager, these might alert the user to call his home or his office, etc. In the same way, group call capability could be obtained by providing each unit in the group with a group code address in addition to its individual address. This, however, is a relatively expensive method for accomplishing group calls. The circuit of the present invention, on the other hand, utilizes signals already present in the referenced patented system with a minimum of additional logic elements.

Figure 3:
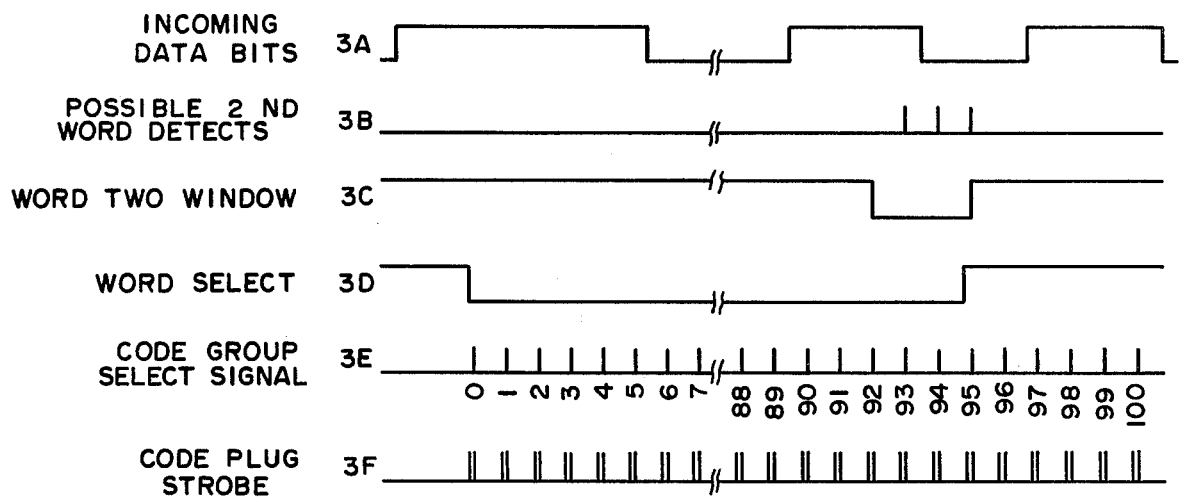
FIG. 3 is a timing chart relating to the detector of FIG. 1.

The circuit of the present invention is adapted to be used with the address detector of the above-referenced patents and is shown herein in that environment. It should, of course, be obvious to anyone skilled in the art that other detectors could utilize the invention and as will be described hereinafter, the invention is only dependent on certain input signals. In the detector of FIGS. 1 and 3, only those portions having particular relevance to the inputs of the circuit of the invention will be explained in detail.

Signal 3A received at the input terminal 10 of the detector of FIG. 1 may have been broadcast, received, demodulated, amplified and limited in any suitable fashion, but for use in this detector, it will now consist of a train of binary digital signals or bits (termed "high" and "low" hereinafter). In this train of signals there may be an individual page address made up of two different 23 bit binary words, spaced apart by one half bit, or a group address made up of one binary word sent twice in sequence, spaced apart by one and one half bits.

For easier understanding of the invention, an individual page will be considered first. Signals from the terminal 10 are coupled through a control gate 11 to a sample register 12. A clock 13 running at four times the received bit rate, is coupled through a NOR gate 14 to the register 12 for sampling each received bit four times and shifting the received bits through the register. The clock 13 is also coupled to a counter or divider 16 wherein the clock frequency is divided by two and by four. The portion of FIG. 1 including the NOR gate 14, and an Exclusive (EX) OR 20, NAND gate 21, signal correlator 22, NOR gates 23 and 24, flip-flop 25, signal strobe generator 26, inverter 27, and counter timer 28 provide primarily a battery saver function and for the purposes of this description it is only necessary to have a signal from the signal strobe generator 26 enabling clock pulses from the clock 13 to be passed through the NOR 14 for enabling the signal 3F (see FIG. 3). The signal 3F will be further discussed hereinafter.

A decoder timing generator 30 is coupled to an output of the counter 16 from which is received one pulse for every four clock pulses. The generator 30 is also coupled to the output of the NOR 14 and to the output of the signal strobe generator 26. Control signals from the decoder timing generator 30 provide most of the function timing for the detector of FIG. 1. The address codes of the unit are stored in a code plug 36; in this instance, 12 bits for each of the two words. A multiplex control gate 37 controls the coupling of each group of 6 bits to a reference register 38. A parity tree 40 is coupled to the reference register 38 and to the multiplex control gate 37 for adding 11 parity bits after the stored 12 bits of each word. Also coupled to the code plug 36 is an output of a word flip-flop 41, the function of which will be described more fully hereinafter. At this point in the description it will suffice to say that one output 3D, (also 4A), of the flip-flop 41 changes level when it is desired to look for a different word in the train of input signals. The level of the word select signal 3D applied to an input of the code plug 36 enables the stored data bits of a selected one of the stored words to be transferred to the register 38. One output signal 3E (also 4C) from the decoder timing generator 30 is termed "code group select signal" and has one pulse during each sampling period. The signal 3E determines whether the first or second group of six bits of the enabled word is to be coupled to the register 38. Another output signal 3F (also 4D) termed "code plug strobe" triggers the entry of the chosen six bits into the register 38 and it consists of a pair of pulses during each sampling period. The signals 3D, 3E and 3F are coupled to the circuit of FIG. 2 for the group call detect, although it is to be noted that the second pulse in each pair of pulses in signal 3F serves no purpose in the group call detect circuit. It is to be seen from the timing chart of FIG. 4 that, lacking signal 4C (3E) an equivalent signal could be derived from the second pulse of 4D (3F).

Individual alerts are obtained asynchronously in the circuit of FIG. 1 by first comparing received binary signals with the stored bits of the individual address code. Each of the received bits is sampled four times and stored in the sample register 12, comprising 92 stages. Assuming that all 92 stages contain temporarily stored data bits, the bits will be inverted then coupled to an EX OR 42 as will the 23 bits of the word in reference register 38. Note that each bit from the register 38 will be compared with four bits from the sample register 12. The output of the EX OR 42 is coupled to a correlator/counter selector 43. The selecting function will be described hereinbelow, but at this point in the sequence, the selector couples the correlation counts to a word correlator/sample counter 44. All of the above-described comparisons will take place during one sampling period. After each comparison, the sample bit in stage 92 is cycled back to the first stage of the sample register 12. After four comparisons, the compared bit in the storage register is also cycled. After 92 comparisons, the bit in the last stage of the sample register is lost and a new sample is added into the first stage, a new set of comparisons then beginning until word one is detected. At word one detect, the word select signal 3D from the word flip-flop 41 changes level, the code plug 36 will develop word two in the storage register 38, the correlator/counter selector 43 will stop coupling error signals to the counter in the word correlator/sample counter 44 and instead will couple a pulse from the decoder timing generator 30 during each sample bit period. The 3D signal also sets a window counter enable flip-flop 46 and a window flip-flop 47 for subsequent operation. At count 92, the window counter 48 triggers window flip-flop 47, whose output is 3C, and if word two is detected on counts 93, 94 or 95, an individual alert signal is provided to one of the terminals 50. A NAND gate 51, inverted word flip-flop 52 and four NAND gates 53 are included in the detector to provide detect for combinations of address words and their complements, i.e., AB, AB, AB and AB. At the 95 count, the window flip-flop 47 is reset by the window counter 48, and the word flip-flop 41 and window counter enable flip-flop 46 will also be reset. If word two was not detected during the 92-95 count window, the detector is now able to detect a group call.

To recapitulate briefly, a first word one has been detected, and this detect has provided synchronization for detection of word two. Word two did not appear in the sample register during the appropriate window, and the detector of FIG. 1 has now gone back to looking for word one. Remembering that a group call consists of two word ones in sequence, spaced slightly farther apart than the word one-word two spacing of an individual page, it will be seen that the second word one will be in the sample register immediately after the end of the word two detect window (after count 95). The second word one detect signal should then occur at approximately count 98, possibly at count 99.

Figure 2:
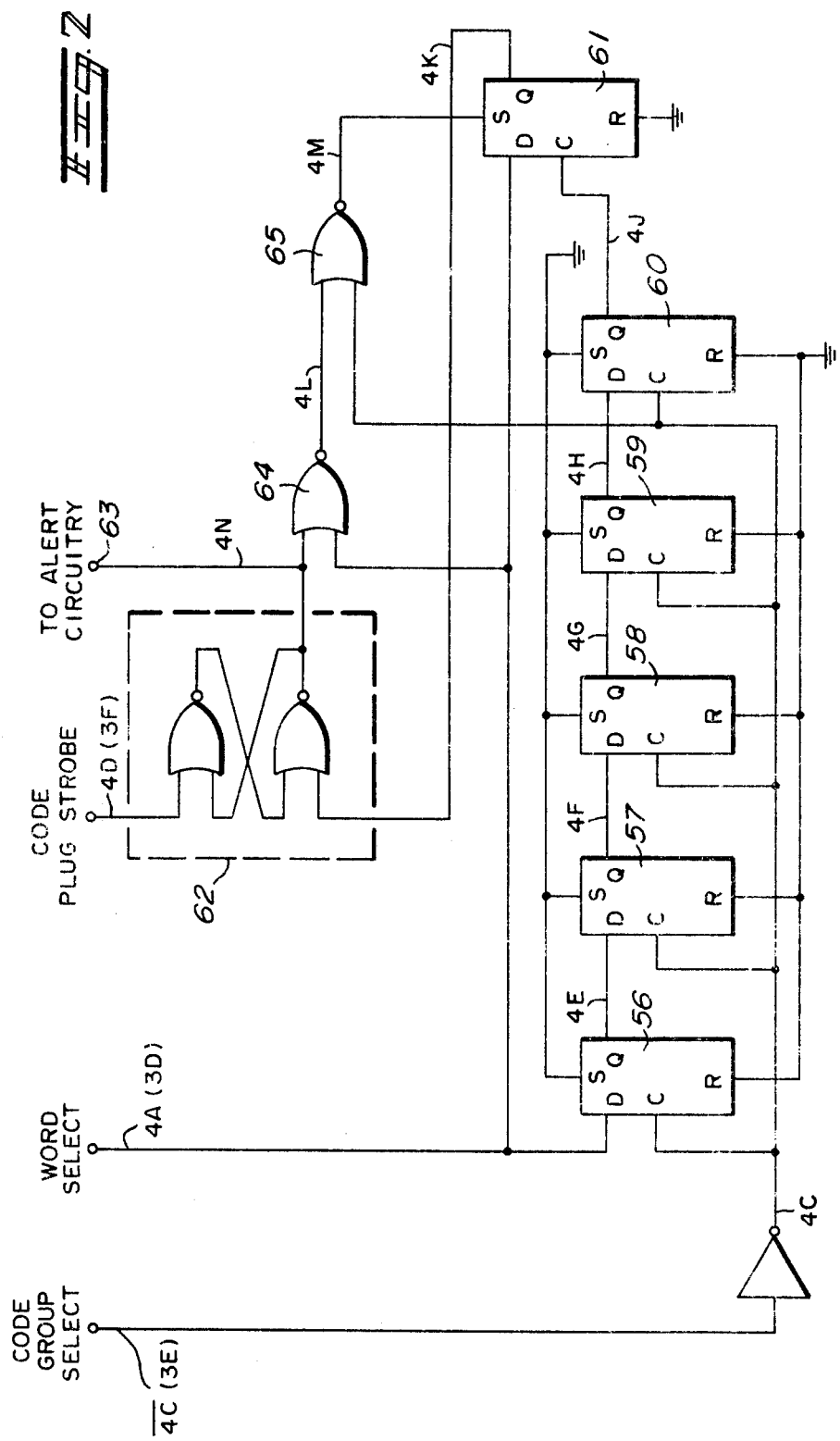
FIG. 2 is a block diagram of a circuit embodying the invention as it could be used with the detector of FIG. 1.
Figure 4:
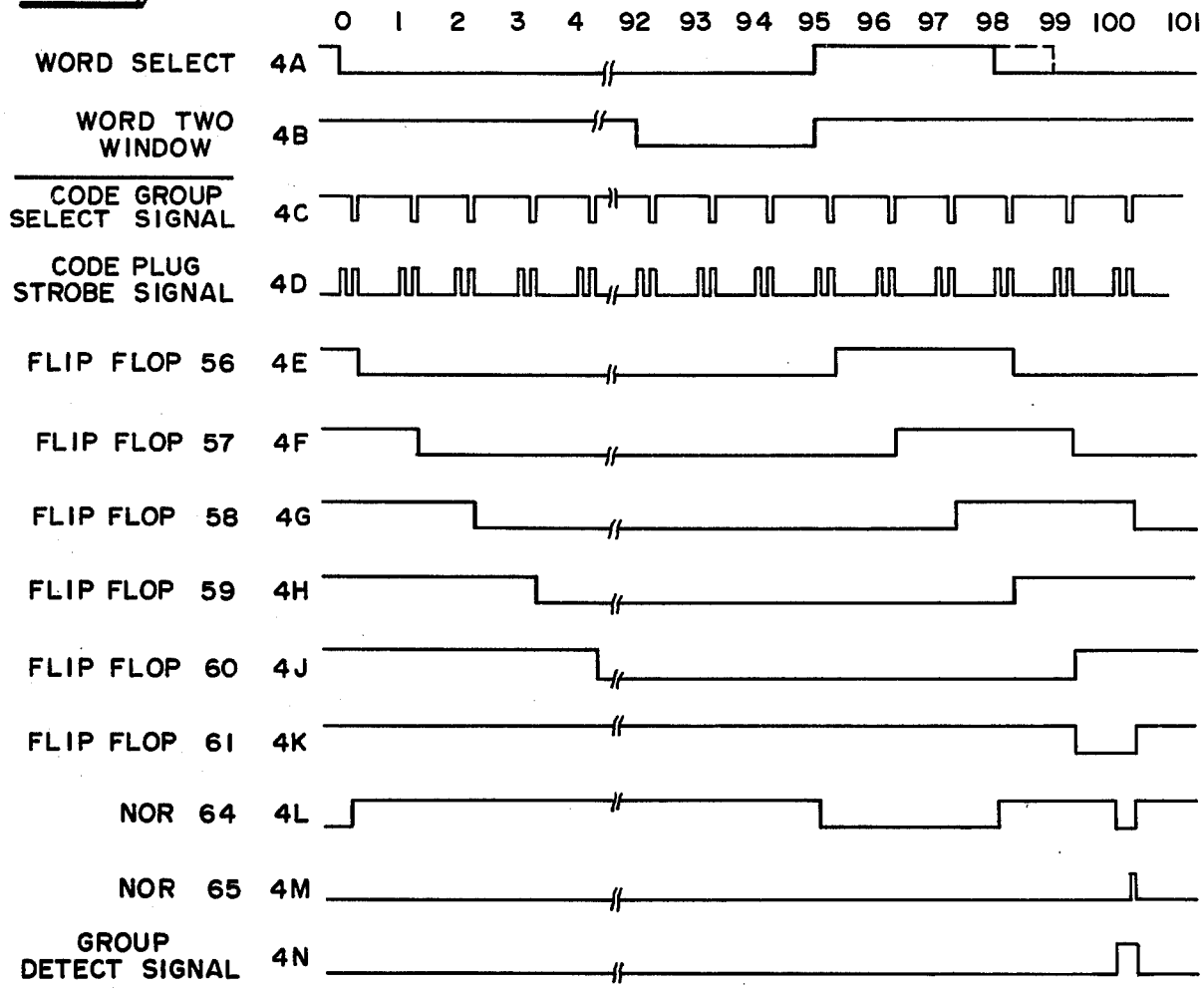
FIG. 4 is a timing chart relating to the invention as in FIG. 2.

Referring now more particularly to FIGS. 2 and 4, five synchronously clocked D-type flip-flops 56, 57, 58, 59 and 60, from a delay line having signal 4C (3E) as the clock signal. The D input of flip-flop 56 is the word select signal 4A (3D). The Q output of stage 56 is coupled to the D input of stage 57, Q 57 to D 58, etc. When the word select signal 4A goes low at the first word one detect, the Q outputs of the flip-flops 56-60 go low in sequence. Another bistable circuit or flip-flop 61 has the word select signal 4A on its D input, and is clocked by the Q output of stage 60. When the word select signal 4A goes high at the end of the word two window which is the 95th count following the first word detect, the signal 4E from the Q output of stage 56 will go high at the first clock pulse (4C) after the count 95. The signal 4F from the Q output of stage 57 will go high at the clock pulse after the count 96, etc., until, at the clock pulse after count 99, the signal 4J from the Q output of stage 60 will go high, causing the Q output of stage 61 output (4K) to go low if a second word one detect has occurred at count 98 or 99. The Q output of stage 61 is coupled to one input of an RS flip-flop or bistable circuit 62. The second input of the flip-flop 62 is the code plug strobe signal 4D (3F) and the output of the flip-flop 62 is the group call detect signal 4N which is coupled to the alert circuitry of the detector of FIG. 1 via terminal 63 as are the terminals 50. The output signal 4N is clamped low by the Q output of stage 61 signal 4K until count 99, then the subsequent pulse of code plug strobe 4D at count 100 will drive the output 4N high, causing a group call detect pulse to be coupled to the alert circuitry. The output 4N is also coupled to one input of a NOR gate 64, the second input of the NOR gate being the signal 4A. The output 4L of the NOR 64 will be high from the first word one detect at count zero until the signal 4A goes high at count 95. The NOR 64 output 4L will then go low and stay low unless the second word one detect occurs at count 98 or 99. In that event the NOR 64 output 4L will go high and stay high until the flip-flop 62 output 4N goes high at count 100. The signal 4L is coupled to one input of a NOR gate 65, the second input being signal 4C, and the NOR gate 65 output 4M is the "set" signal for the flip-flop 61. The signal 4M will be low until after count 100 except for pulses (not shown) between counts 95 and 98 which have no effect since the flip-flop 61 receives no clock signals during that period. After count 100, NOR 65 goes high when the signal 4C goes low, and puts a high on the S input of the flip-flop 61. The Q output of stage 61 then goes high, forcing the flip-flop 62 output signal 4N to go low, thus ending the group call detect pulse.

Thus, there has been provided, in an asynchronous detector, the capability of simultaneous detection of an address comprising two identical binary words by all detectors for which that word is the address word one. The invention utilizes information signals already present in the detector and requires only a minimum of added logic elements. Although the invention has been shown and described in the environment of a pager, it is to be noted that the invention is applicable to other devices having the requisite information signals available. As is well known to those skilled in the art, other logic elements may provide the same function, and it is contemplated to include all such equivalents as fall within the spirit and scope of the appended claims.

What is claimed is:

1. In a detector for detecting first and second predetermined words within a train of signals, each word comprising a plurality of binary bits and said words being spaced apart by a first predetermined time period, including timing means for providing first and second control pulses within each bit period, word select means for providing a first signal in response to a first detection of the first word, said first signal presetting the detector for detection of the second word, counter means for counting a second predetermined time period substantially equal to the period of the second word and for providing a signal enabling the detection of the second word at the end of said second period, for counting a third predetermined time period subsequent to the second time period and equal to at least two bit periods, then providing a signal enabling the detection of the first word, group call detect circuitry for detecting said first word twice in sequence and spaced apart by the third predetermined time period, said third period being longer than said first time period, and comprising:

delay means coupled to the timing means and to the counter means for delaying the first word enabling signal for a period at least equal to the third time period; and bistable means coupled to the delay means for being clamped by the delayed signal, and to the timing means for being triggered by the next first control pulse and reset by the end of the subsequent second control pulse for providing a group call detect signal.

2. In a detector according to claim 1, wherein the group call detect circuitry further includes first gating means coupled to the output of the bistable means and to the output of the word select means for providing an output signal in response to the group call detect signal, and second gating means coupled to the output of the first gating means and to the timing means for receiving the second control pulse of each pair of control pulses, the second gating means providing an output pulse for resetting the group call detect circuitry.

3. In a detector according to claim 1 wherein the timing means includes clock means for supplying at least one clock pulse during each bit period.

4. In a detector according to claim 1 wherein the timing means includes clock means for supplying four clock pulses during each bit period and divider means coupled to divide the output of the clock means by two and by four.

5. In a detector according to claim 4 wherein the detector includes data input means, first register means coupled to the clock means and to the input means for sampling each received bit four times and wherein the register means includes a plurality of storage cells equal to the number of bits in one of said words multiplied by the sampling rate.

6. In a detector according to claim 5 wherein the detector includes second register means and storage means for storing bits corresponding to bits of said first and second words, the storage means coupled to the timing means for receiving the said first and second control pulses and operative to provide predetermined groups of bits of the first and second words to the second register means in response to said first and second control pulses.

7. In a detector according to claim 6 wherein the detector includes gating circuit means coupled to the first and second register means for comparison of the respective bits stored therein and selector means coupled to the gating circuit means for receiving signals corresponding to miscorrelations of the stored bits, second counter means coupled to the selector means, the selector means selectively coupling the miscorrelation signals to the second counter means.

8. Group call circuitry for detecting an asynchronous two-word page address consisting of two identical words in sequence within a train of signals, and comprising:

storage means for storing two binary words;
first register means for receiving a selected one of said stored words from the storage means;
word select means coupled to the storage means and providing a first word select signal for selecting one of said stored words to be inserted into the first register means;
timing means coupled to the storage means for providing at least one pair of control pulses during each data bit period within the train of signals, the storage means being responsive to said pulses to couple selected groups of stored data bits to the first register means;
means for receiving said train of signals;
second register means coupled to the receiving means for sampling and temporarily storing digital signals corresponding to the data bits within the train of signals;
comparator means coupled to the first and second register means for comparing the data bits of the stored word and the sampled data bits;
correlating means coupled to the comparator means and the word select means for providing a first word detect signal in response to a first predetermined number of correlations between data bits, the word select means being responsive to said signal to provide a second word select signal for selecting the other of said stored words to be inserted into the first register means;
first counter means enabled by the first word detect signal from the correlating means for counting a first period of time at least equal to the time period of the second stored word, the correlating means being responsive to the end of the first period of time for counting correlations between sampled bits and stored bits of the second word;
second counter means coupled to the first counter means and to the word select means for counting a second predetermined period of time following the first predetermined period, the word select means being responsive to a second predetermined number of correlations during the second predetermined period to provide a third word select signal for selecting the first one of said stored words to be stored in the first register means;
delay means coupled to the word select means and the timing means for delaying the word select signals and coupled to be clocked by the second pulse of each pair of control pulses;
first bistable means coupled to the delay means and to the word select means for being enabled by the third word select signal and for providing an output signal in response to the delayed second word select signal;
second bistable means coupled to the first bistable means and to the timing means for being enabled by the output signal of the first bistable means and for providing group call detect signal in response to the first subsequent control pulse.

* * * * *